(12) United States Patent
Wang et al.

(10) Patent No.: US 9,973,062 B2
(45) Date of Patent: May 15, 2018

(54) METHOD OF SYNTHESIZING ALUMINUM CARBON NANOTUBE MATERIALS FOR STRUCTURAL AND CONDUCTOR APPLICATIONS

(71) Applicant: GM Global Technology Operations LLC, Detroit, MI (US)

(72) Inventors: Qigui Wang, Rochester Hills, MI (US); Xinkuan Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 959 days.

(21) Appl. No.: 14/319,287

(22) Filed: Jun. 30, 2014

(65) Prior Publication Data

US 2015/0381020 A1 Dec. 31, 2015

(51) Int. Cl.
| | |
|---|---|
| *B22F 1/02* | (2006.01) |
| *H02K 15/00* | (2006.01) |
| *H02K 17/16* | (2006.01) |
| *C22C 26/00* | (2006.01) |
| *H02K 3/02* | (2006.01) |
| *B22F 5/00* | (2006.01) |

(52) U.S. Cl.
CPC ........... *H02K 15/0012* (2013.01); *B22F 1/02* (2013.01); *C22C 26/00* (2013.01); *H02K 3/02* (2013.01); *H02K 17/165* (2013.01); *B22F 5/00* (2013.01); *B22F 2998/10* (2013.01); *C22C 2026/002* (2013.01)

(58) Field of Classification Search
CPC .......... H02K 15/0012; B22F 3/10; B22F 1/02
See application file for complete search history.

(56) References Cited

U.S. PATENT DOCUMENTS

2011/0163627 A1* 7/2011 Wang ............... H02K 17/16
310/211

FOREIGN PATENT DOCUMENTS

| CN | 1730688 A | 2/2006 |
|---|---|---|
| CN | 102122867 A | 7/2011 |

OTHER PUBLICATIONS

C.N. He, et al; "Optimization of the chemical vapor deposition process for fabrication of carbon nanotube/Al composite powders," Materials Research Bulletin 45 (2010) 1182-1188.*

(Continued)

*Primary Examiner* — Christopher Kessler

(57) ABSTRACT

A method of in situ formation of an aluminum carbon nanotube composite material and an induction motor component produced with such composite. The method includes forming an aluminum-based matrix by mixing a catalyst precursor with an aluminum powder such that a colloidal compound is formed that is subsequently sintered to leave a catalytically-active material formed on the surface of the aluminum powder. A carbon-containing gas is introduced to the composite catalyst that includes aluminum and the catalytic metal so that carbon nanotube reinforcements are grown on the aluminum-based matrix with the assistance of the catalytically-active metal. Additional mechanical processing steps may also include pressurizing, sintering and cold-rolling the aluminum carbon nanotube composite material.

19 Claims, 6 Drawing Sheets

(56) References Cited

OTHER PUBLICATIONS

C.N. He, et al; "An approach for obtaining the structural diversity of multi-walled carbon nanotubes on Ni/Al catalyst with low Ni content," Journal of Alloys and Compounds 489 (2010) 20-25.*
He et al., "An Approach to Obtaining Homogeneously Dispersed Carbon Nanotubes in Al Powders for Preparing Reinforced Al-Matrix Composites" Adv. Mater. 2007, 19, 1128-1132.*
Jianli Kang et al., Achieving highly dispersed nanofibres a thigh loading in carbon nanofibre-metal composites, Nanotechnology 20 (2009) 235607 (7pp).*
J.L. Kanga et al., Synthesis and growth mechanisms of metal filled carbon nanostructures by CVD using Ni/Y catalyst supported on copper, Journal of Alloys and Compounds 456 (2008) 290-296.
J.L. Kang at al., Synthesis and growth mechanism of metal filled carbon nanostructures by CVD using Ni/Y cataiyst supported on copper, Journal of Alloys and Compounds 456 (2008) 290-296.

* cited by examiner

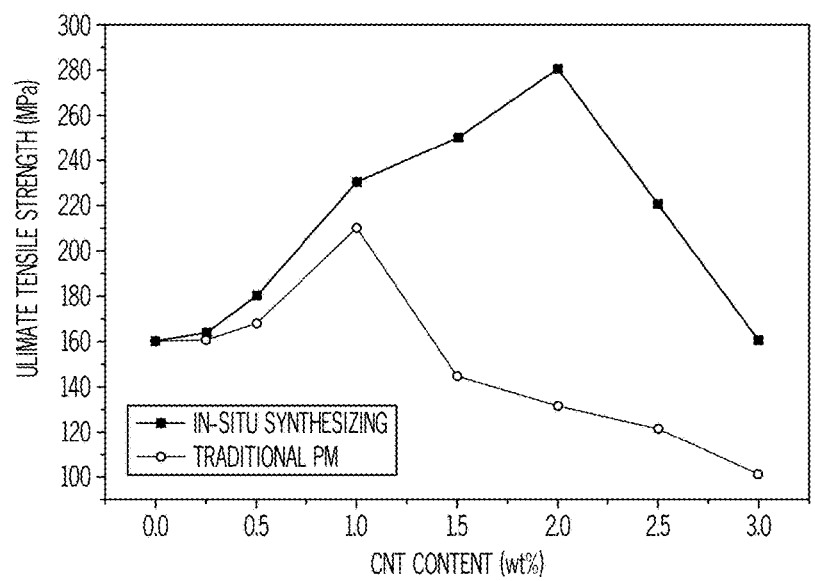
FIG. 9
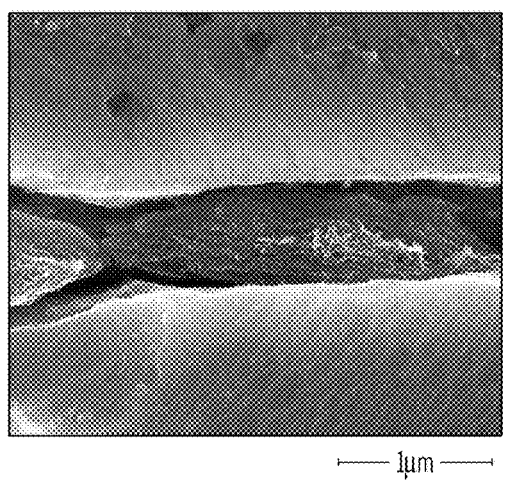 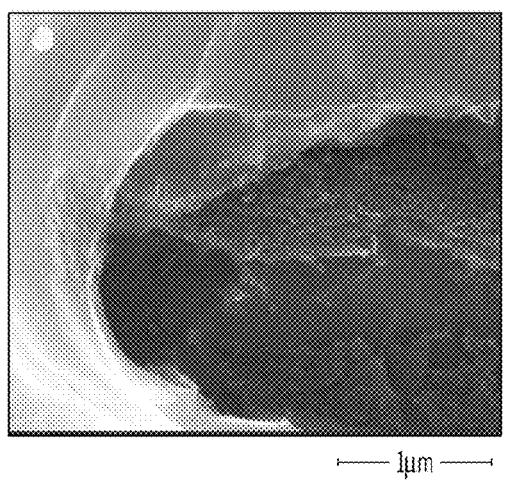
FIG. 10A          FIG. 10B

METHOD OF SYNTHESIZING ALUMINUM CARBON NANOTUBE MATERIALS FOR STRUCTURAL AND CONDUCTOR APPLICATIONS

BACKGROUND OF THE INVENTION

This invention is related to manufacturing of Al-CNTs composites, in particular, a new technology of in situ synthesizing the Al-CNTs materials for structural and conductor applications.

Carbon nanotubes (CNTs), first discovered in 1991, are now well known to possess extremely high strength, elastic modulus, electrical and thermal conductivity, all while being of low weight construction. They are shaped as elongated hollow cylinders with honeycomb-like nanostructured graphene walls (i.e., that are no more than one atom in thickness). Despite these advantages, the development of metal matrix composites based on CNTs has not been forthcoming, due at least in part to the difficulty of dispersing the CNTs in a manner analogous to polymer- and ceramic-based CNT composites. In the cases of polymer and ceramic matrix composites, some reports have demonstrated that agglomerated CNTs with a high cohesive force could be broken up and homogeneously mixed into a matrix by utilizing their electro-kinetic potential; from this, the resultant composites can exhibit the desired structural performance. Nevertheless, these approaches are not effective for CNT dispersion in metals because of the low controllability of the zeta potential of metal particles and the large density difference between the metal and CNTs. Mechanical mixing and hot extrusion has been proposed as a way to overcome these issues; however, the mechanical properties of resulting the Al-CNTs composites (an ultimate tensile strength of 84 MPa with a 5% by volume addition of CNTs), are not significantly improved relative to pure aluminum (discussed below). Another approach tried to mix CNTs with aluminum powders by highly efficient mixing using a tubular shaker-mixer and planetary mill; the difficulty of this approach was that the CNTs weren't adequately dispersed, causing electrical performance to suffer.

One form of electric induction motor involves a rotating armature (rotor) surrounded by a coil-wound stationary field (stator). When electric current is passed through the stator windings, a part of the stator known as the pole (which may be made up of a magnetically permeable material, such as iron) around which the windings are wrapped becomes magnetically energized, which in turn imparts an electromagnetic force to the rotor, causing it to rotate. In motive applications, a shaft attached to the rotor can be used to provide propulsive force to a vehicle through the turning of one or more linked wheels. Such a motor could be especially useful in vehicles that rely either entirely on electric power, or as part of a hybrid system, where the electric motor and an internal combustion engine (such as conventional gasoline or diesel variant) cooperate with one another to produce the desired motive force.

A "squirrel-cage" rotor is a common example of an electric induction motor, and derives its name from its cage-like cylindrical shape, where numerous metal rotor bars or rods extend longitudinally and are spaced around the cylindrical periphery of a central axis of rotation. The bars are held in a fixed relationship to one another by metal end rings so that adjacent bars and connected end rings form a cage-like structure with numerous coil-like electrically continuous loops. Due to the proximity of the rotor to the stator, changes in the magnetic field produced in the stator induce current in the highly conductive loops formed by the bars and end rings. This current turns the rotor into an electromagnet that can spin in an attempt to align itself with the magnetic field produced in the stator. To increase the magnetic intensity of the rotor, a series of laminated plates (typically made from a material that has a lower magnetic resistance (i.e., more magnetically permeable) than air, such as iron) are mounted to the shaft or related mandrel such that they occupy the substantial entirety of the space between the shaft and the cage formed by the bars and end rings. Moreover, a low electrical conductivity material (for example, a coating) could be used to minimize electrical contact between them. The cooperation of the laminated stack of plates with the current flowing through the loops of the cage help to strengthen the magnetic field generated by the loops of the rotor, and leads to higher levels of torque generated in the attached shaft. To keep the torque generated at a relatively constant level, the bars making up the cage may be skewed to define a slightly helical pattern rather than one that is strictly longitudinal.

In one form, the bars (also referred to herein as conductor bars) are made from a highly-conductive material, such as pure aluminum. While such material has excellent electrical conductivity, its mechanical properties (as alluded to above) tend to be limited, thereby hampering its ability to meet durability requirements, especially in the harsh environments associated with automotive applications. This problem is exacerbated by the bars' inherently high aspect ratio and attendant increased susceptibility to defects in casting and other conventional fabrication techniques. While alloying elements can be added to the aluminum to improve its strength or related mechanical properties, electrical performance tends to become compromised through the lower conductivity.

Numerous fabrication techniques have been used to produce the bars and end plates (or end rings) of an induction motor. For example, the bars and end plates or rings may be created as separately-formed structures that are then joined together through welding, fastening, adhesives or the like. As with the connection between the plates of the laminate stack, a non-conducting adhesive may be used to secure the bars to similarly sized and shaped slots formed in the laminated plates. Another fabrication technique for longitudinal metal bars involves casting, where molten aluminum may be poured directly into the slots once the laminate plate structure has been assembled. Casting of a squirrel-cage rotor is advantageous relative to assembling it from separate parts, as it reduces the cost and manufacturing variances associated with assembled components, although it is hard to make defect-free conductor bars with traditional casting techniques. Moreover, neither casting nor joining are able to produce bars or their resulting cages that simultaneously satisfy the stringent electrical and structural needs of an induction motor that is based on such bars and cages.

SUMMARY OF THE INVENTION

According to an aspect of the present invention, a method of in situ formation of an Al-CNT composite material is disclosed. The method includes forming an aluminum-based matrix by mixing a catalyst precursor with an aluminum powder such that a colloidal compound is produced, and then sintering the colloidal compound such that a catalytically-active material forms on the surface of the aluminum powder. From this, CNT reinforcement can be grown or otherwise formed on the aluminum-based matrix, where a catalytic reaction between a carbon-containing gas and the modified surface of the aluminum powder promotes the formation of an AL-CNT composite. In a particular form, this composite may be further processed through the application of one or more of heat, pressure and mechanical manipulation as a way to control CNT agglomeration and its consequent buildup on and bonding to the aluminum-based matrix.

According to another aspect of the present invention, a method of in situ formation of an Al-CNT composite material is disclosed. The method includes forming an aluminum-based matrix by mixing a nickel-containing catalyst precursor with an aluminum powder such that a colloidal compound is formed, and then sintering the colloidal compound such that a nickel-based catalytically-active material forms on the surface of the aluminum powder. From this, a CNT reinforcement is grown or otherwise formed on the matrix via exposure of the catalytically-active material to a carbon-containing gas. From this, the Al-CNT composite is subjected to at least one of a pressurizing, sintering and cold-rolling operation to promote desirable bonding and consequent mechanical and electrical performance improvements.

According to still another aspect of the present invention, a method of forming a rotor for an induction motor is disclosed. The method includes preparing numerous conductor bars from an Al-CNT composite material, where the CNT material is made by forming an aluminum-based matrix by mixing a catalyst precursor with an aluminum powder such that a colloidal compound is formed, and then sintering the colloidal compound such that a nickel-based catalytically-active material forms on the surface of the aluminum powder. After this, the CNT reinforcement is grown or otherwise formed on the matrix through the cooperation of the catalytically-active material and a carbon-containing gas, after which one or more of a pressurizing, sintering and cold-rolling operation are used. Once the Al-CNT is put into the appropriate conductor bar shape, the resulting bars are placed into corresponding slots that are defined within a laminated steel stack, and then the bars are combined with rings or plates that are disposed adjacent respective ends of the stack; in this way the various conductor bars and end rings or plates form a generally cylindrical-shaped cage. Both the cage and stack are cooperative with one another such that upon use of the rotor in an induction motor, the cage is used as the rotor's primary electric current path, while the stack is used as the rotor's primary (or even substantially complete) magnetic flux path.

BRIEF DESCRIPTION OF THE DRAWINGS

The following detailed description of the preferred embodiments of the present invention can be best understood when read in conjunction with the following drawings, where like structure is indicated with like reference numerals and in which the various components of the drawings are not necessarily illustrated to scale:

FIG. 9 depicts a comparison of the ultimate tensile strengths of samples made by the disclosed in situ synthesizing method in this application and the traditional PM approach and then cold rolled after extrusion; and FIGS. 10A and 10B depict the morphology of CNTs in Al-CNT composites prepared by two different methods, where one (FIG. 10A) is based on the in situ approach of the present invention and the other (FIG. 10B) is based on a traditional PM process.

DETAILED DESCRIPTION OF THE PREFERRED EMBODIMENT

Figure 1:
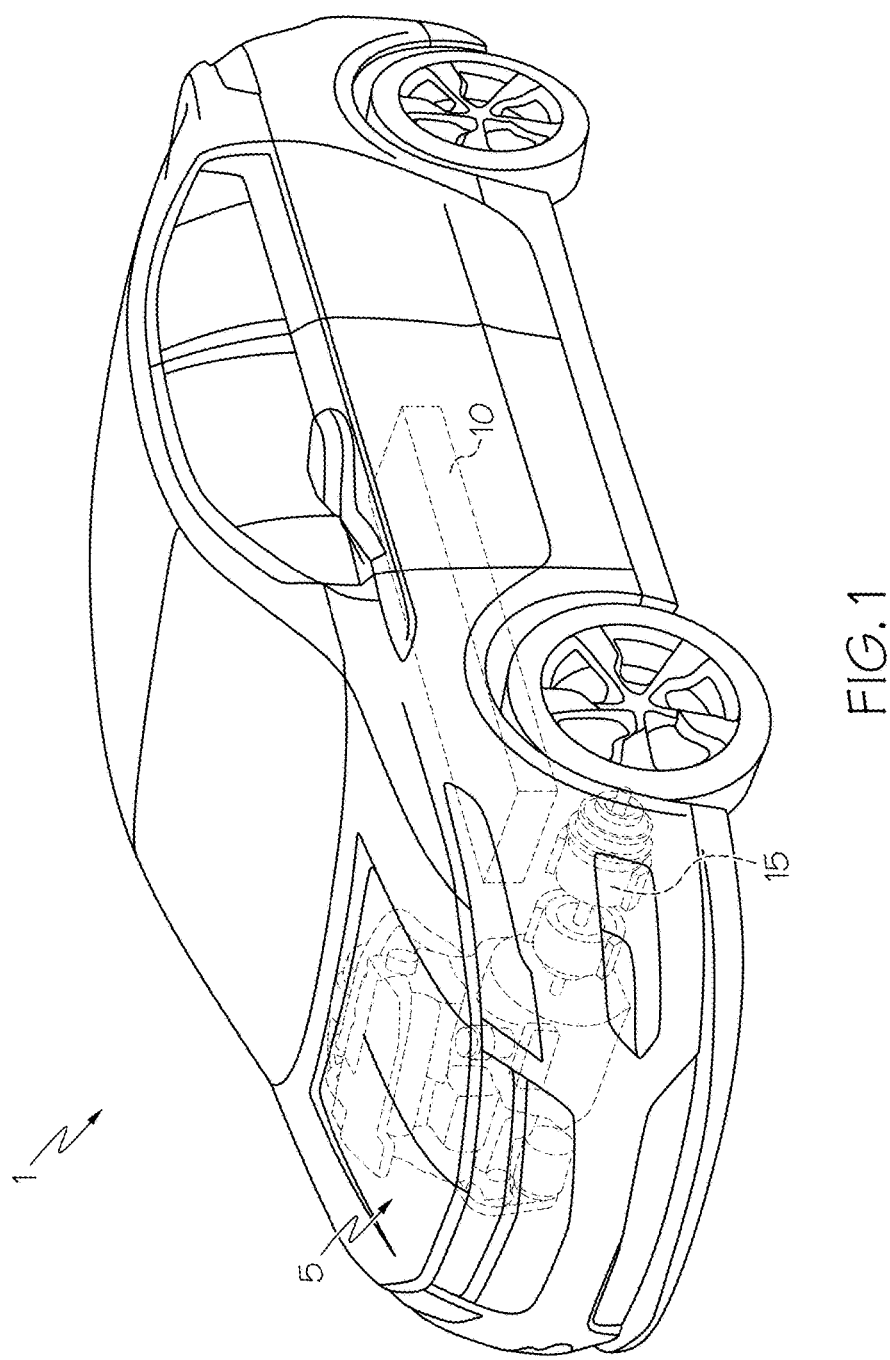
FIG. 1 depicts a vehicle with a hybrid propulsion system in the form of a battery pack, electric induction motor and an internal combustion engine.

Referring first to FIG. 1, a vehicle 1 includes a hybrid propulsion system in the form of an electric power source made up of a conventional ICE 5 and a battery pack 10, both cooperative with an electric motor 15. Such a vehicle is known as a hybrid electric vehicle (HEV). It will be appreciated by those skilled in the art that vehicle 1 may not require an ICE 5, in such case, rather than being an HEV, it is an electric vehicle (EV); either form is within the scope of the present invention. Additional drivetrain components (none of which are shown) useful in providing propulsive power to one or more of the wheels and coupled to one or both of the battery pack 10 and ICE 5 are understood to include rotating shafts, axles, transmission, controllers or the like. While vehicle 1 is presently shown as a car, the applicability of the hybrid propulsion system to other such automotive forms (including trucks, buses, aircraft, watercraft, spacecraft and motorcycles) is deemed to be within the scope of the present invention.

Figure 2:
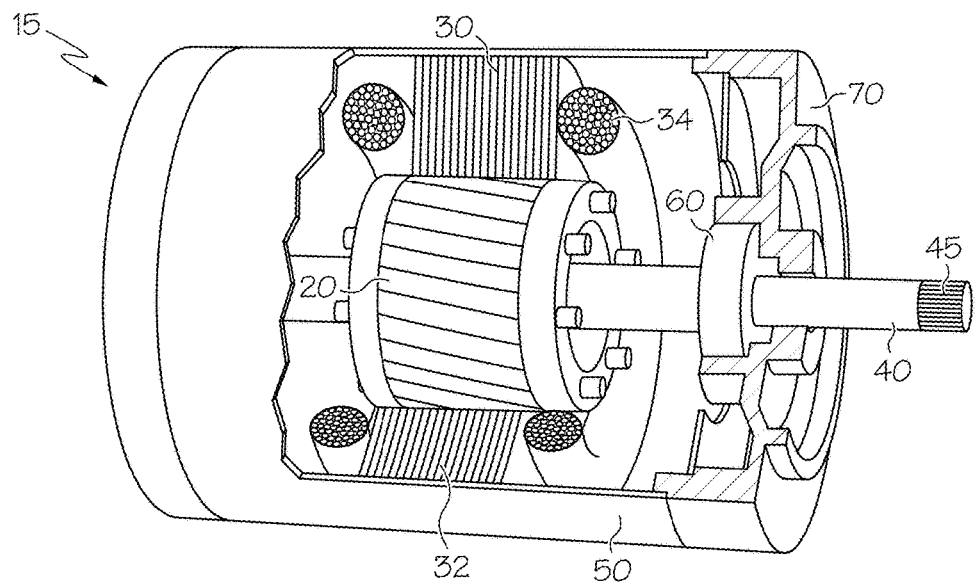
FIG. 2 depicts a perspective cutaway view of an induction motor showing with particularity the relationship between a stator and a squirrel-cage rotor portions of the latter of which can be made according to the present invention.

Referring next to FIG. 2, electric motor 15 includes a rotor 20 that spins in response to changes in a magnetic field from stator 30 that includes a magnetically permeable pole 32 surrounded by numerous field coils 34. The pole 32 may be assembled as a laminate of individual plates (discussed in more detail below in conjunction with the rotor 20) that acts as an electromagnet as electric current is passed through the windings of the field coils 34. Initial connection to the coils 34 may come from an external electrical source, such as line power, a generator, batteries or other conventional sources. Rotor 20 is mounted on a shaft or mandrel 40 so that the spinning motion of the rotor 20 can be turned into useful work. For example, teeth 45 formed in the end of shaft 40 can be used to interact with a complementary surface to turn a wheel, pulley, fan (none of which are shown) or the like. As will be appreciated by those skilled in the art, motor 15, in the configuration shown where the rotor 20 and stator 30 are not in contact with one another, is referred to as an induction motor, where the principles of reciprocal induction of electric current and magnetic flux in appropriately-configured structures is well-known. A housing 50 is used to contain the rotor 20 and stator 30, while the rotatable shaft 40 may be secured to the housing 50 via one or more bearings 60 that could interact with an end plate 70 that is formed with or otherwise secured to the housing 50.

Figure 3:
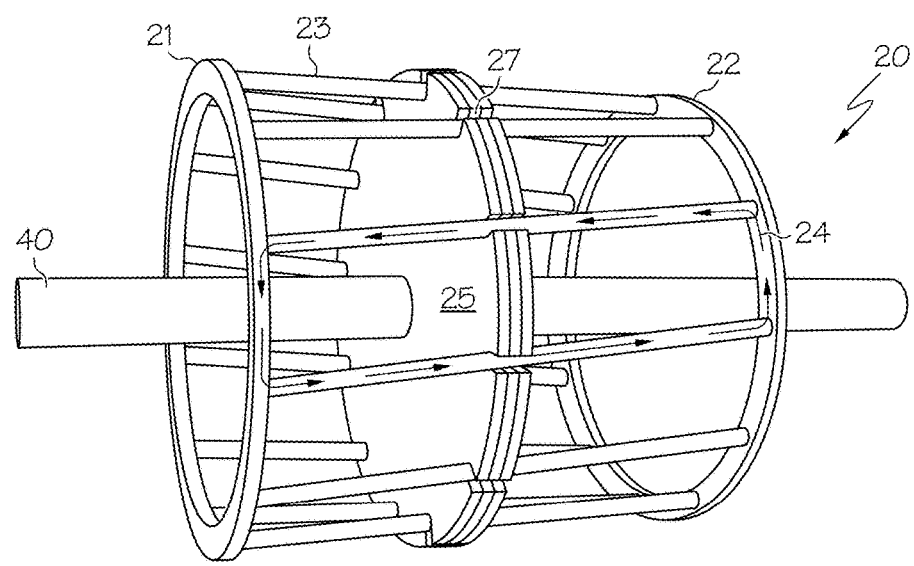
FIG. 3 depicts the rotor of the motor of FIG. 2, highlighting the connectivity of the cage's end rings and longitudinal bars, and a notional current loop formed by the rings and bars, as well as the placement of a portion of the laminate stack within the cage.

Referring next to FIG. 3, rotor 20 is often referred to as a squirrel-cage rotor, and includes a first end ring 21, a second end ring 22 axially spaced relative to the first end ring 21 to define a generally cylindrical shape, and a plurality of rotor bars 23 that extend substantially longitudinally between the end rings 21 and 22 around the periphery of the cylindrical shape. Electrically, each of the bars 23 and end rings 21 and 22 are made of the Al-CNT composite so that the connection of the rotor bars 23 to the end rings 21 and 22 produces numerous generally rectangular-shaped current loops 24. A magnetically permeable material (for example, iron) is placed within the rotor 20 in the space between the bars 23 and end rings 21 and 22 such that a current passing through the loops 24 induces a stronger magnetic flux in the rotor 20. Preferably, this material is in the form of numerous laminated plates 25 that are held together either by an interlock or by the casting and mounted to the shaft 40; such a configuration is referred to as a laminate stack, laminate assembly or some variant thereof. Because the electrical conductivity of the bars 23 and end rings 21 and 22 is significantly greater than that of the laminate stack, a vast majority of the electric current is routed through the continuous loops 24 formed by the bars 23 and end rings 21 and 22. Thus, upon the cyclical changes in magnetic field from the adjacent (but not touching) electromagnets set up in stator 30, the back-and-forth passage of current in the loops 24 cause the laminate stack to function as an electromagnet that forces the rotor 20 to spin to bring each portion toward or away from a corresponding adjacent pole on the stator 30, depending on whether they have the same or opposite polarity.

The components used to define the cage of squirrel-cage rotor 20 are shown, where most of the plates 25 making up laminate stack are removed for clarity. In fact, only three of the plates 25 are shown, each with slots 27 formed at the plate outer periphery and spaced relative to one another by a distance to allow them to accommodate the longitudinal bars 23 that will be placed therein. As shown in both FIGS. 2 and 3, the longitudinal bars 23 are slightly skewed relative to the longitudinal axis (which generally coincides with shaft 40) of rotor 20 to provide a more even distribution of the torque imparted to the laminate stack and shaft 40. One of the loops 24 is highlighted to show one notional path (shown by arrows) that the electrical current may take during one portion of an alternating electromagnetic cycle.

Figure 4:
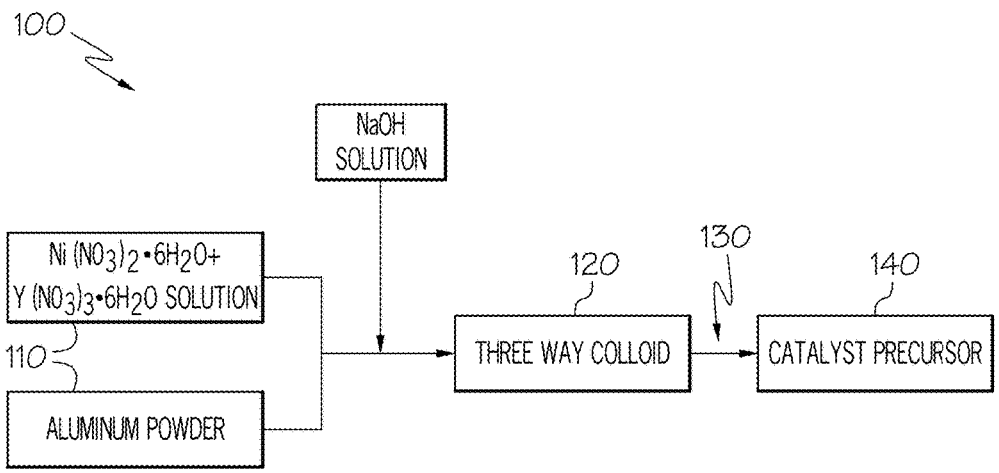
FIG. 4 depicts a block diagram of steps used in the preparation of a catalyst-based precursor material.
Figure 5:
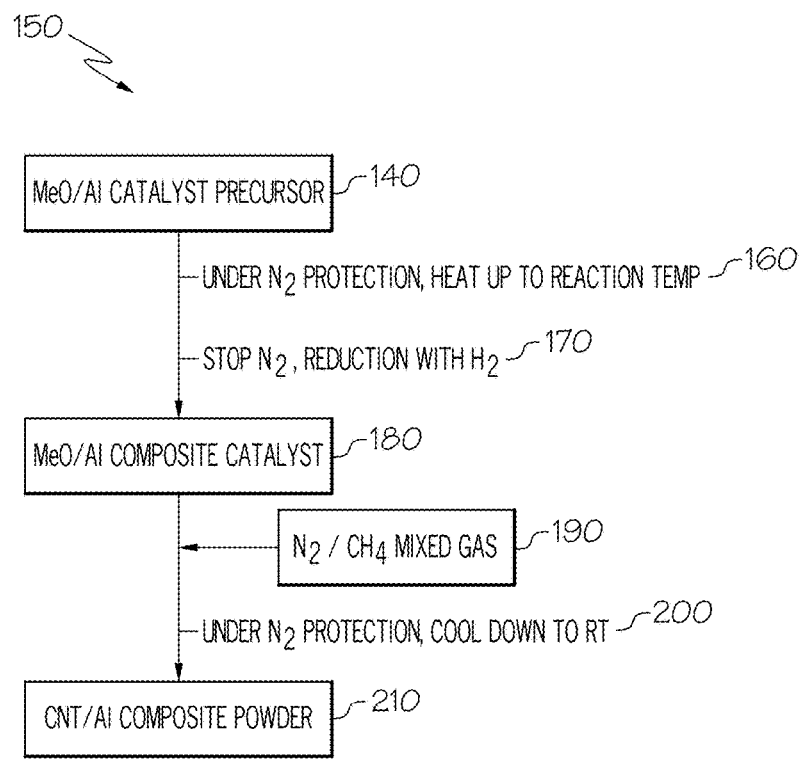
FIG. 5 depicts a block diagram of steps used in forming an Al-CNT composite that uses the catalyst-based precursor material of FIG. 4.

Referring next to FIGS. 4 and 5, the Al-CNT composites of the present invention are fabricated by in situ (rather an ex vivo) synthesis employing CVD. Referring with particularity to FIG. 4, the development of a catalyst precursor (for example, NiO—Al) 140 is first shown, where the present inventors have determined that nickel (Ni) is a good starting metal, and that compared with other metals (such as iron, cobalt or the like), its combination of cost, ease of use and catalytic performance (ability to overcome the kinetic threshold) is superior. Mixing 110 aluminum powders with a solution of $Ni(NO_3)_2 \cdot 6H_2O$ to form the colloid compound 120 of $Ni(OH)_2$ on the aluminum powder surfaces, after which sintering at about 500 Celsius with argon protection is used. The present inventors have determined that when nickel alone is used as the catalytic metal, some suitable atomic ratios of nickel to aluminum are 1:19, 1:9 and 1:5. $Ni(NO_3)_2 \cdot 6H_2O$, by virtue of being inexpensive and readily available, promotes the formation of NiO through a simple reaction, although it will be appreciated by those skilled in the art that other solutions (for example, nickel acetate) may also be used. The optional addition of yttrium (Y, in the form of $Y(NO_3)_3 \cdot 6H_2O$) may be used to improve the catalytic performance of nickel. The present inventors have determined that when yttrium and nickel both are used as the catalytic metals, a suitable atomic ratio of yttrium to nickel to aluminum is 1:4:53. In the catalyst precursor 140 preparation, sodium hydroxide (NaOH) is used to first form the intermediate product $Ni(OH)_2$, which is better able to deposit onto the surface of the aluminum powders; such a reaction is shown as follows.

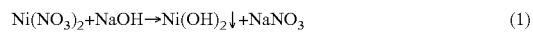

$$Ni(NO_3)_2 + NaOH \rightarrow Ni(OH)_2 \downarrow + NaNO_3 \qquad (1)$$

Preferably, the CNTs are synthesized using small precursors. Thus, after sintering at higher temperature, the $Ni(OH)_2$ colloid decomposes into NiO the particle size of which is in the nanometer (up to 10 nm) range. The present inventors have determined that if the size of the catalyst is too large (for example, reaching into the micrometer range), it is unable to grow CNTs. As such, it is important to control the size of the catalyst by keeping its size in the nanometer scale and prevent it from getting larger during the CNT growth. The formation of the colloid compound 120 is generally represented by the following reaction:

$$Ni^{x+} + OH^- \rightarrow Ni(OH)_2 \qquad (2)$$

while the resulting precursor 140 (made up of NiO/A composite powder) is formed by vacuum drying 130 the colloid compound 120 at about 100 Celsius for about 8 hours and then putting it into a furnace and heated up to a high temperature (between about 500 Celsius and about 550 Celsius) for about an hour under argon gas protection. Thus, the NiO of the catalyst precursor 140 coats the aluminum powder surface, after which it is reduced to Ni. Although a direct use of nickel coating could instead be employed, the present inventors determined that it is preferable to instead have the nickel go through the above reactions because the resulting active nickel particle formation results in the more desirable nanometer scale-sized particles. Moreover, traditional techniques such as nickel coating from electroless plating or galvanic plating—in addition to forming larger (i.e., micrometer-range) nickel-coatings—employ a nickel that is not active (and therefore not a good catalyst for CNT applications). Another advantages of the present approach is that aluminum oxidation is avoided by putting aluminum powders in a water solution such as $Ni(NO_3)_2 \cdot 6H_2O$ such that the aluminum is isolated from any ambient oxygen. In a preferred form, the weight percentage of catalyst precursor 140 is 5; in a second preferred embodiment, the weight percentage is 10. The inventors discovered that CNT formation isn't as prevalent when using catalyst precursors in excess of 10 percent of the colloidal compound, as the resulting CNT tended to form into a ball shape instead of tube shape.

Referring with particularity to FIG. 5, the second step 150 is to synthesize the Al-CNT composite powder through CNT growth from the catalyst precursor 140 onto the matrix aluminum powder surfaces using a chemical vapor deposition (CVD)-based method. In the synthesis process, the NiO/Al powders of the catalyst precursor 140 are kept at a temperature of about 600 Celsius to about 650 Celsius for a few minutes (preferably between about 1 to 10 minutes, depending the content of the catalyst) within a nitrogen-based ($N_2$) protective environment 160 that is stopped 170 after a while to enable reduction of the NiO to nickel through the presence of hydrogen. The resulting nickel-aluminum composite catalyst 180 is then exposed to a carbon-containing component 190 (for example, ethylene, methane or formaldehyde, although others may be used, with suitable changes to the various processing parameters to account for the different gas properties) as a way to grow the CNTs. A cooling step 200 (which can be performed under $N_2$ protection) is then used, resulting in the Al-CNT composite powder 210. The present inventors have found that the rate of production of CNTs is the highest when the operation temperature is low, and that much of this stems from the relatively low melting temperature (and consequent operation temperature) of aluminum; as such, they believe the operation temperature is an important parameter for the CNTs production where aluminum forms the matrix material for the ensuing composite.

After synthesis, the Al-CNT composite material 190 is produced by packing aluminum powders with CNTs under pressure of about 200 MPa to about 250 MPa, additional sintering at a temperature between about 550 Celsius and about 650 Celsius, and then mechanical manipulation (in particular, cold-rolling) under a pressure between about 400 MPa and about 600 MPa.

The mixture of $N_2$ 160 and ethylene ($C_2H_4$) 170 is first introduced into furnace (at a temperature of between about 600 Celsius and about 650 Celsius) and then the NiO/Al powders of the catalyst precursor 140 are moved into the furnace. The growth of CNTs takes place immediately when the NiO/Al powders of the catalyst precursor 140 encounter the $N2/C_2H_4$ gas. The growth of the CNTs is stopped when the catalyst precursor 140 is fully exhausted (typically after a few minutes). In the present context, the exhaustion of the nickel particles is not necessarily the same as there being no residual nickel upon completion of the reaction, but rather that part of the nickel may remain on the surface of aluminum powder and part on the top end of the CNTs. During the decomposition of $C_2H_4$ to form CNTs, the nickel may become covered by carbon materials from the gas, and consequently not able to come into contact with the remaining gas that is still present, thereby effectively causing a loss in nickel activity as the reaction stops. Instead of ethylene, the carbon source could be methane $CH_4$ or formaldehyde ($CH_2O$).

Figure 6A:
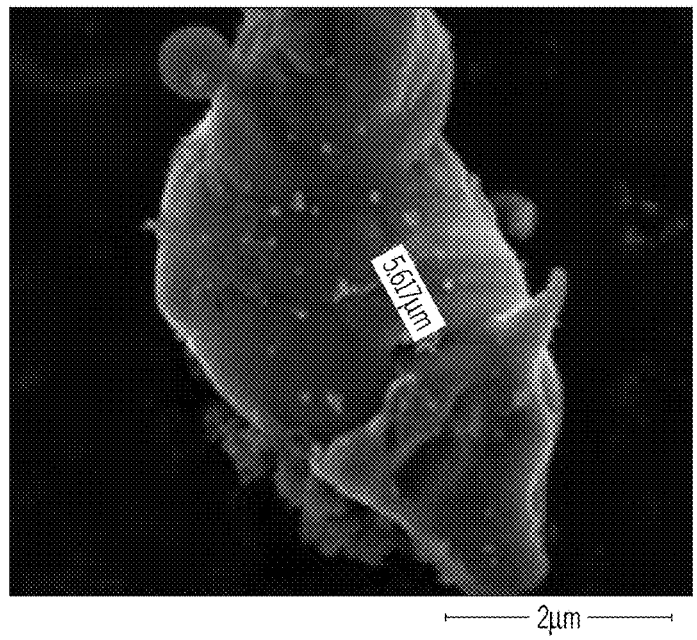
FIGS. 6A and 6B depict a comparison between an aluminum powder before and after it has a catalytic material formed on its surface.
Figure 6B:
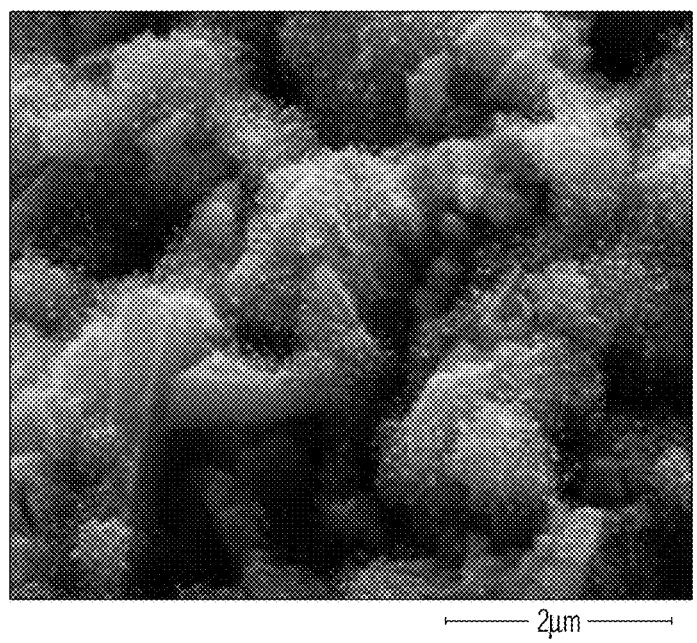

Referring next to FIGS. 6A and 6B, results of composites made in accordance with the present invention are shown. In particular, scanning electron microscope (SEM) images show extensive, relatively even dispersal of the CNTs on the aluminum matrix. As stated above, the volume fraction of CNTs in the aluminum powders can be determined by weight.

Figure 7:
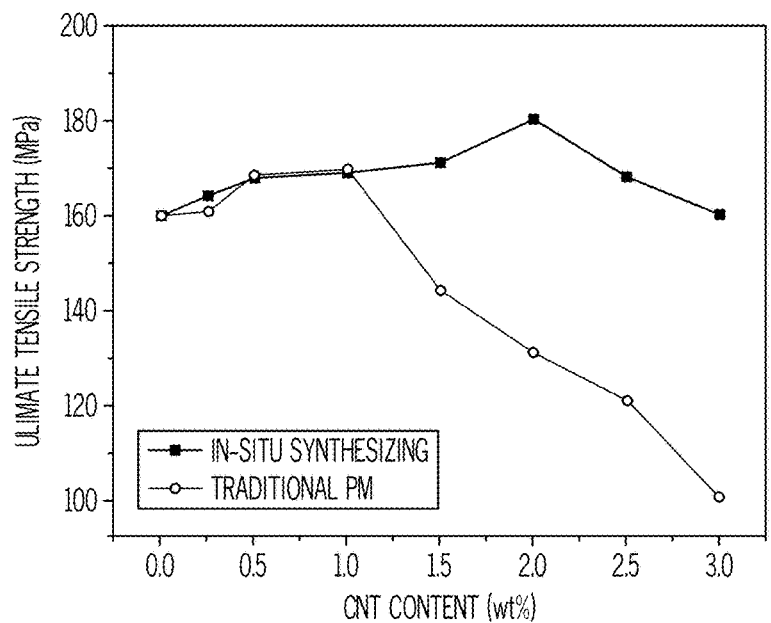
FIG. 7 depicts a comparison of the ultimate tensile strengths of samples made by the disclosed in situ synthesizing method in this application and the traditional powder metallurgy (PM) approach.
Figure 8:
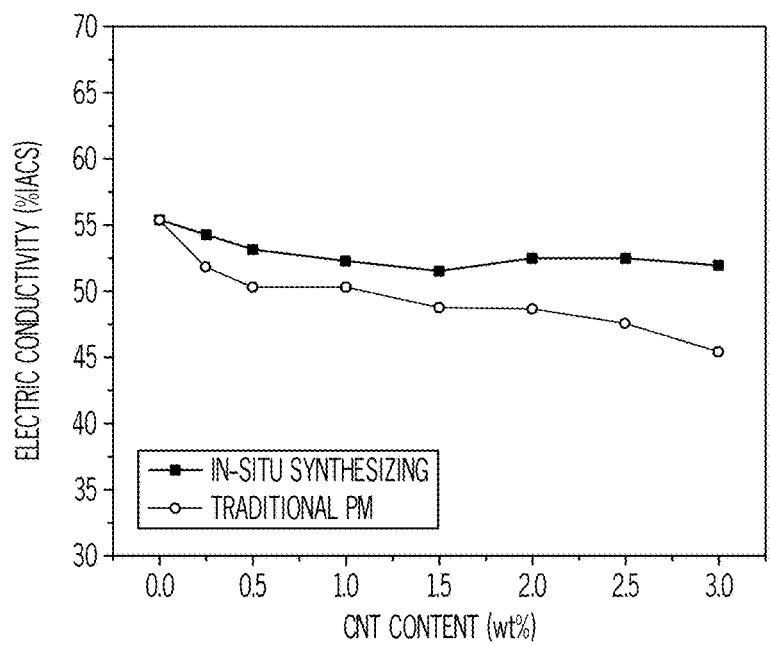
FIG. 8 depicts a comparison of the electrical conductivity of samples made by the disclosed in situ synthesizing method in this application and the traditional PM approach.

Referring next to FIGS. 7 through 9, the results of mechanical and electrical property experiments on Al-CNT composites formed by the present in situ method are shown. In particular, the inventors have found that the disclosed in situ synthesizing approach shows advantages over the traditional PM method, as both tensile strength and electric conductivity are improved. As shown with particularity in FIGS. 7 and 9, significantly improved mechanical performance (in the form of ultimate tensile strength (UTS) can be seen relative to traditional PM approaches in situations, especially at higher CNT loadings. As can be seen, at weight percentage of CNTs greater than about 1.0, the UTS performance metric of the traditional approach declines rapidly compared to that of the present invention. The present inventors are of the belief that the strengthening effects in metallic materials increases with the amount of added strengthening phase (at least up to a point). In the present case, the CNTs act as the strengthening phase for the aluminum matrix in the present Al/CNT composites. On the other hand, the size of the CNTs in conventional Al/CNTs composites is at the micrometer scale, due to agglomeration of the strengthening phase; this in turn can lead to a weak bonding between the matrix and the CNT reinforcement. As such, excessive amounts of CNT powder after agglomeration do nothing to improve the strength; moreover—as shown in FIGS. 7 and 9 for the traditional PM process—they may contribute to a significant drop-off in performance beyond a certain amount, where weakening effects due to the Al-to-CNT bonding dominate. As such, it is important to strike a balance between these strengthening and weakening effects. The advantage of in situ synthesis processing is to improve the agglomeration of CNTs onto the powder by growing the former on the latter rather than merely mixing them as is done by conventional methods. In this way, the in situ method changes the microstructural relationship between the CNTs and the underlying matrix powders in a way that conventional processing (such as traditional PM and related approaches) can't. As mentioned elsewhere in this disclosure, the in situ method of the present invention may further include post-growth processing steps to further promote the coupling of the CNTs onto the powder. Such steps include pressurizing the composite material that includes the CNTs that are grown on the powder, sintering this pressurized composite material and then cold-rolling it to promote desirable levels of size, orientation and surface coverage. Referring with particularity to FIG. 8, of equal importance is that electrical conductivity remains high.

Referring next to FIGS. 10A and 10B, in a preferred form, the nanotubes are aligned along a single direction. Significantly, in the presently-disclosed in situ process, the CNTs are grown on the surface of Al powders. After sintering, these powders will be deformed and elongated during extrusion and/or cold rolling, meaning that the CNTs on the surface of each powder will be stretched and deformed along a single direction which is the same direction as the aluminum powders during deformation, as shown with particularity in FIG. 10A, whereas in traditional PM processes, the CNTs will be agglomerated to the aforementioned micrometer scale; the present inventors are of the belief that this inability to be separated, deformed and stretched along a single direction (as shown in FIG. 10B where the CNTs remain in a ball shape after deformation) is a significant factor in the differences in mechanical properties (such as the UTS mentioned above in conjunction with FIGS. 7 and 9)). Importantly, this ability to control or modify the agglomeration according to the present in situ method improves the bonding between the aluminum-based powder and the CNTs relative to that of the traditional ex vivo methods where the CNTs will not deform simultaneously with aluminum powders during extraction.

It is noted that terms like "preferably", "generally" and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention, it is noted that the terms "substantially" and "approximately" and their variants are utilized herein to represent the inherent degree of uncertainty that may be attributed to any quantitative comparison, value, measurement or other representation. The term "substantially" is also utilized herein to represent the degree by which a quantitative representation may vary from a stated reference without resulting in a change in the basic function of the subject matter at issue.

Having described the invention in detail and by reference to specific embodiments, it will nonetheless be apparent that modifications and variations are possible without departing from the scope of the invention defined in the appended claims. In particular it is contemplated that the scope of the present invention is not necessarily limited to stated preferred aspects and exemplified embodiments, but should be governed by the appended claims.

We claim:

1. A method of in situ formation of and processing of an aluminum carbon nanotube composite material, the method comprising:
   forming an aluminum-based matrix comprising:
      mixing a catalyst precursor with an aluminum powder such that a colloidal compound is formed; and
      sintering said colloidal compound such that a catalytically-active material forms on the surface of said aluminum powder; and
      growing carbon nanotube reinforcement on said aluminum-based matrix with said catalytically-active material to form an aluminum carbon nanotube composite material,
   pressurizing said aluminum carbon nanotube composite material;
   sintering said pressurized aluminum carbon nanotube composite material; and
   cold-rolling said sintered, pressurized aluminum carbon nanotube composite material at a pressure sufficient to deform and elongate the aluminum-based matrix.

2. The method of claim 1, wherein said catalyst precursor comprises a metal-containing solution.

3. The method of claim 2, wherein said metal-containing solution is nickel-based.

4. The method of claim 3, wherein said nickel-based metal-containing solution comprises $Ni(NO_3)_2 \cdot 6(H_2O)$.

5. The method of claim 3, wherein said nickel-based metal-containing solution further comprises $Y(NO_3)_3 \cdot 6(H_2O)$.

6. The method of claim 5, wherein an atomic ratio of yttrium to nickel to aluminum is 1:4:53.

7. The method of claim 3, wherein up to about ten percent of said colloidal compound by weight is made up of said catalyst precursor.

8. The method of claim 3, wherein said mixing a catalyst precursor with an aluminum powder such that a colloidal compound is formed further comprises adding a sodium hydroxide solution such that a three-way colloidal solution comprising $Ni(NO_3)_2 \cdot 6(H_2O)$, $Y(NO_3)_3 \cdot 6(H_2O)$, and aluminum powder is formed.

9. The method of claim 1, wherein said sintering of said colloidal compound takes place in an inert environment.

10. The method of claim 9, wherein said sintering of said colloidal compound takes place at a temperature of about 500 Celsius.

11. The method of claim 1, wherein said growing carbon nanotube reinforcement comprises exposing said catalytically-active material to a carbon-containing gas.

12. The method of claim 11, wherein said exposing takes place through chemical vapor deposition.

13. The method of claim 12, wherein said carbon-containing gas comprises a mixture of nitrogen and at least one of ethylene, methane and formaldehyde.

14. The method of claim 13, wherein said catalytically-active material is exposed to said mixture of nitrogen and methane in a temperature environment of between about 600 Celsius and about 650 Celsius for up to 10 minutes.

15. The method of claim 1, wherein said pressurizing takes place at between about 200 MPa and about 250 MPa.

16. The method of claim 1, wherein said sintering of said pressurized aluminum carbon nanotube composite material takes place at a temperature between about 550 Celsius and about 650 Celsius.

17. The method of claim 1, wherein said cold-rolling takes place at a pressure of between about 400 MPa and about 600 MPa.

18. A method of in situ formation of and processing of an aluminum carbon nanotube composite material, the method comprising:
   forming an aluminum-based matrix comprising:
      mixing a nickel-containing catalyst precursor with an aluminum powder such that a colloidal compound is formed; and
      sintering said colloidal compound such that a nickel-based catalytically-active material forms on the surface of said aluminum powder;
      growing carbon nanotube reinforcement on said aluminum-based matrix with said catalytically-active material by exposing said catalytically-active material to a carbon-containing gas to form an aluminum carbon nanotube composite material; and
   subjecting said aluminum carbon nanotube composite material to cold-rolling at a pressure sufficient to deform and elongate the aluminum-based matrix.

19. A method of forming a rotor for an induction motor, said method comprising:
   preparing a plurality of conductor bars made from an aluminum carbon nanotube composite material, said carbon nanotube material made by:
      forming an aluminum-based matrix comprising:
      mixing a catalyst precursor with an aluminum powder such that a colloidal compound is formed; and
      sintering said colloidal compound such that a nickel-based catalytically-active material forms on the surface of said aluminum powder;
      growing carbon nanotube reinforcement on said aluminum-based matrix with said catalytically-active material by exposing said catalytically-active material to a carbon-containing gas to form an aluminum carbon nanotube composite material; and
      subjecting said aluminum carbon nanotube composite material to a cold-rolling operation at a pressure sufficient to deform and elongate the aluminum-based matrix;
   placing said conductor bars into a plurality of substantially longitudinal slots defined within a laminated steel stack; and
   combining a pair of rings on respective ends of said plurality of conductor bars such that a cage and is defined thereby, said cage and said stack cooperative with one another to define respective electric current-compatible and magnetic flux-compatible portions of said rotor.

* * * * *